July 10, 1951     I. S. BECKER     2,559,701
HOG MACHINE HAVING ROTARY CUTTER AND FEED CONVEYER
Filed May 22, 1946     4 Sheets-Sheet 1
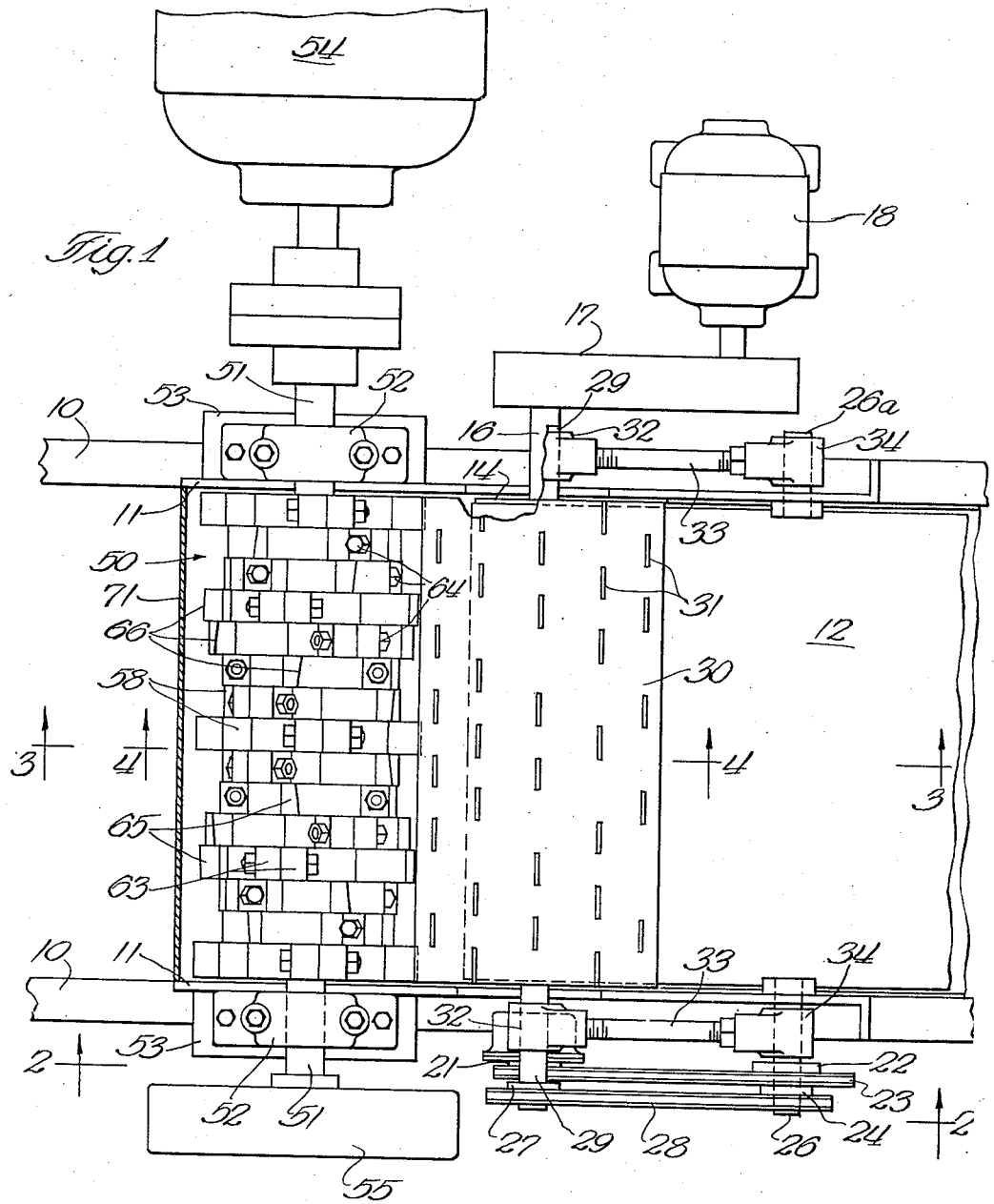
Irven S. Becker
INVENTOR
BY Cook and Schermerhorn
ATTORNEYS July 10, 1951    I. S. BECKER    2,559,701
HOG MACHINE HAVING ROTARY CUTTER AND FEED CONVEYER
Filed May 22, 1946    4 Sheets-Sheet 2
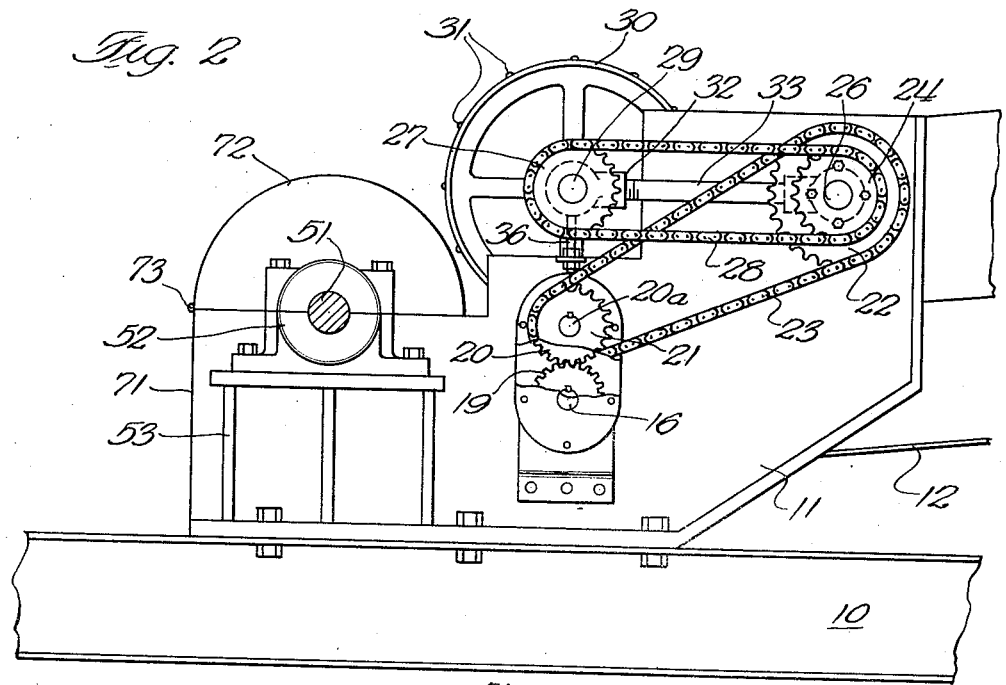
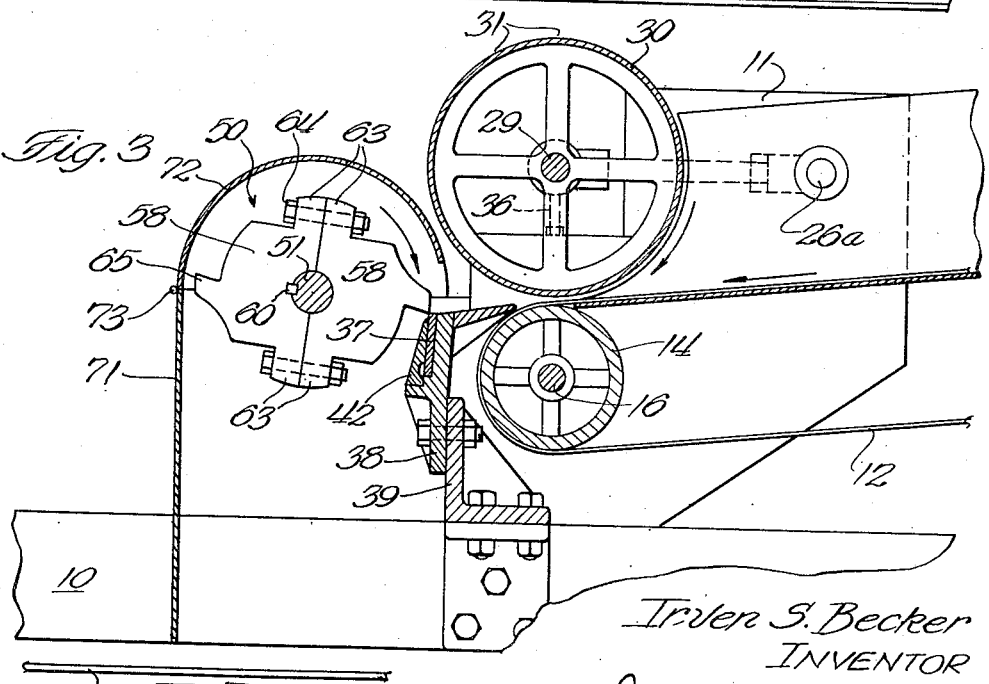
Irven S. Becker
INVENTOR
BY Cook and Schermerhorn
ATTORNEYS

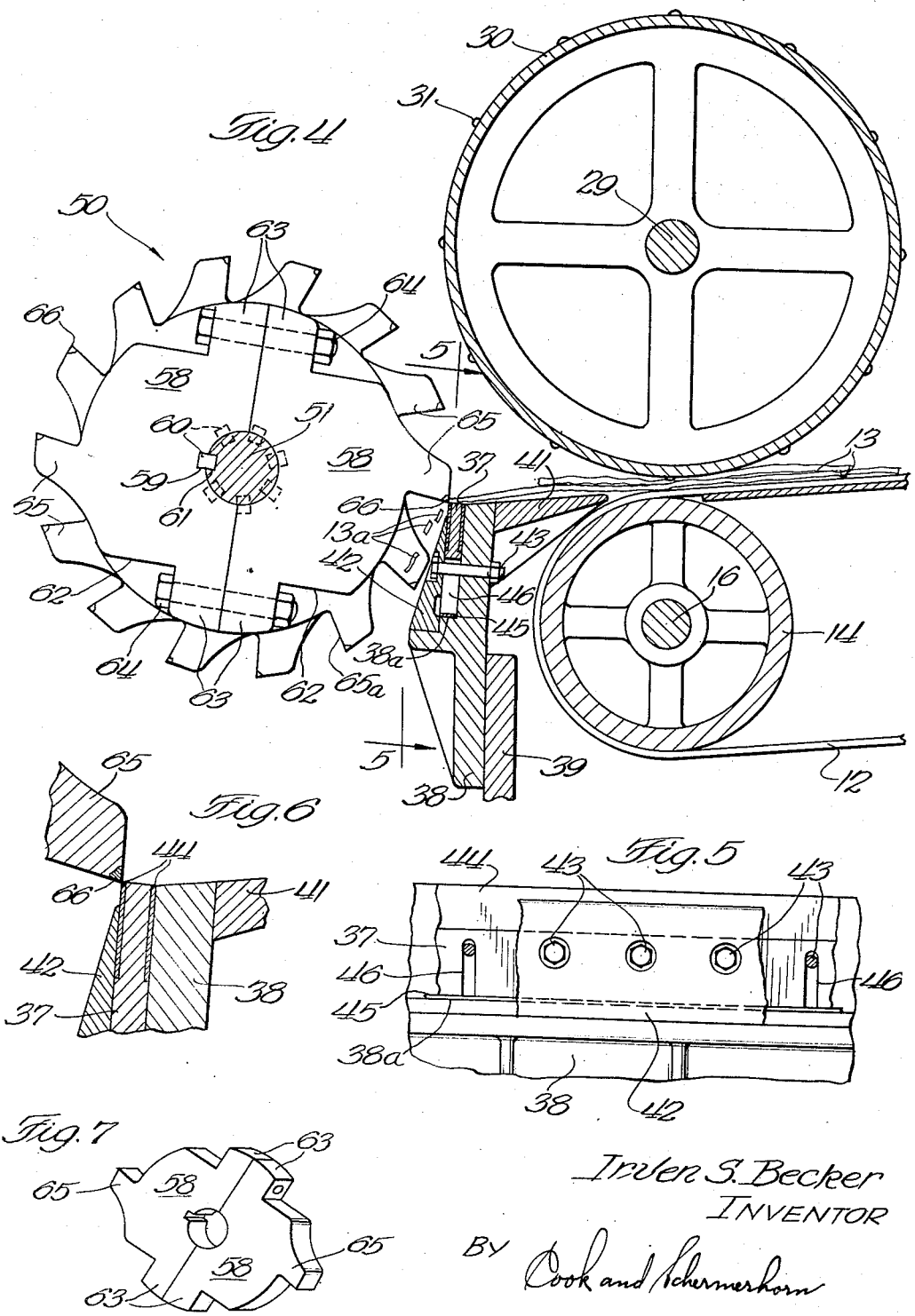

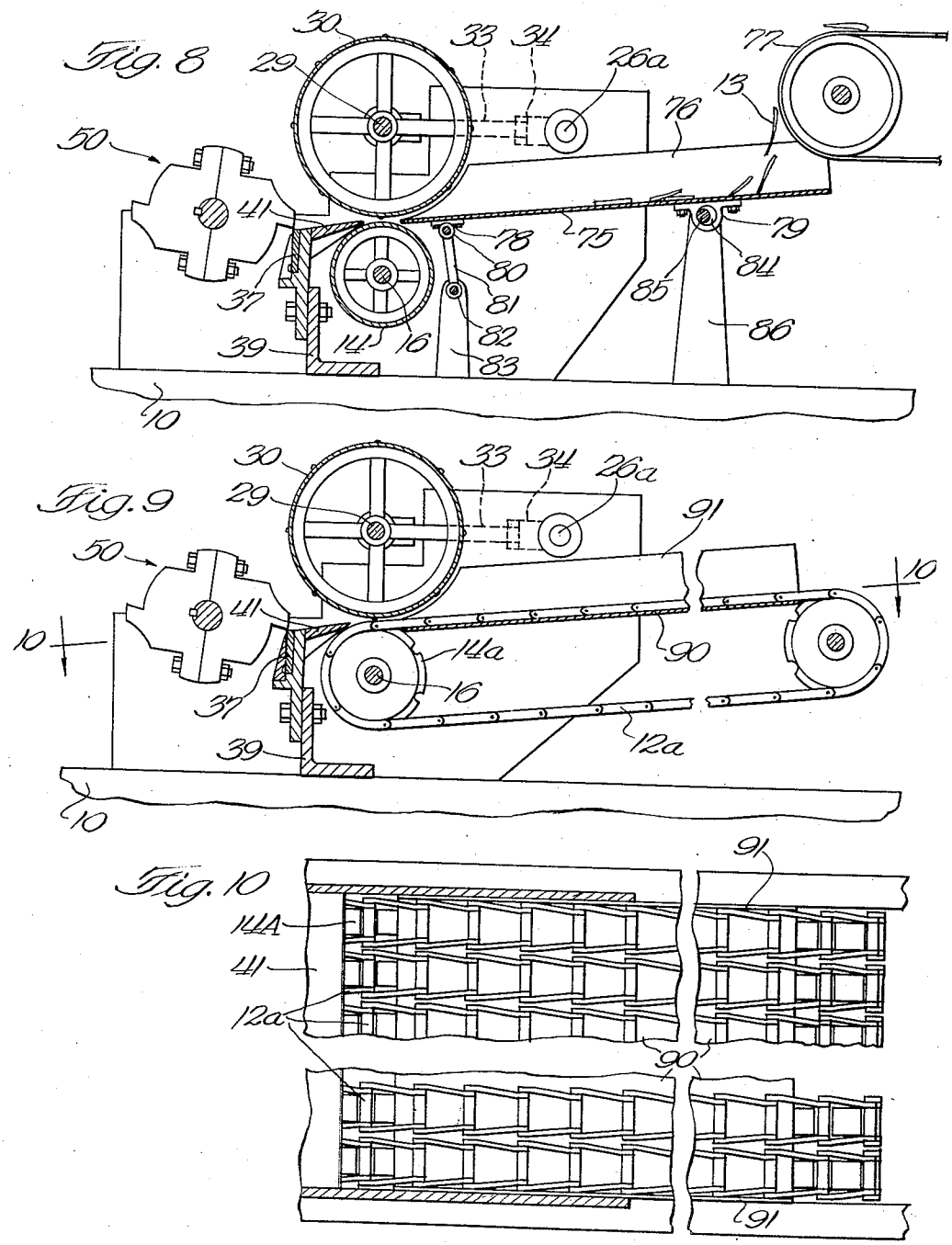

Patented July 10, 1951

2,559,701

UNITED STATES PATENT OFFICE 2,559,701

HOG MACHINE HAVING ROTARY CUTTER AND FEED CONVEYER

Irven S. Becker, Kelso, Wash., assignor to M and M Wood Working Company, Portland, Oreg., a corporation of Oregon Application May 22, 1946, Serial No. 671,645

3 Claims. (Cl. 241—221)

This invention relates to a hog machine, and has particular reference to a hog for cutting scrap veneer, chips and other waste wood into small pieces.

Difficulty has been experienced with conventional hogs used for this purpose, particularly because of breakage of certain parts and loosening and dislocation of other parts whereby such parts become mixed with the material being worked upon and cause serious damage to the machinery. Such hogs have revolving teeth or blades arranged to cut or chop wood material into small pieces, and in order to cut or break the pieces into a small size there must necessarily be relatively small clearance between certain moving and stationary elements in the machine. The rotating parts are subjected to centrifugal force and intense shock and vibration stresses in chopping up tough pieces of wood, all of which tends to loosen parts which are fastened together, and which tends to promote fatigue failure from repeated stress in small parts which are subjected to high stresses in cutting, tearing and breaking apart the tough, fibrous structure of the wood. The mere loosening of certain moving parts often brings them into engagement with a stationary part to cause breakage of one part or the other. A loose piece of metal in the machine, resulting either from breakage or from the unfastening of some part such as a nut or a washer, will almost invariably cause breakage of other parts, and these in turn will cause additional breakage so quickly that a great amount of damage may occur before the machine can be shut down. Usually there is no warning of impending failure, nor is it ordinarily possible by a reasonable inspection to forestall such disasters. The loosening of a small nut or the sudden breakage of a small part frequently precipitates sufficient damage almost instantaneously to compel a shutdown for repair.

A primary object of the present invention is, therefore, to provide a novel construction for a hog machine of the type described which is extremely rugged and which is designed to offer less opportunity for the loosening or breaking of small parts.

Another object is to provide a novel construction employing a single integrally formed cutting bar and a rotary cutter made up of a plurality of heavy rugged cutter blades in such a manner as to obviate the use of small attached cutting elements on both the revolving and stationary parts.

A further object is to provide a machine of the type described having a single solid cutting bar fixedly mounted to cooperate with a rotary cutter made up of a plurality of cutter blades staggered around a shaft in a spiral arrangement.

A further object is to provide a cutting bar having hardened cutting edges integrally united by fusion therewith to obviate the possibility of the hardened parts from working loose or becoming detached.

A further object is to provide a novel feeding mechanism for a hog of the type described.

These and other objects are attained in the novel construction and arrangement of parts shown by way of illustration in the preferred embodiment herein described with reference to the accompanying drawings. In the preferred embodiment, chips, veneer scraps, and other wood refuse products, are fed into the hog machine on a conveyor system having a driven roller drum superposed over the delivery end thereof so as to rotatively bear upon the refuse material. The drum and conveyor together force the material onto a cutting bar where cutting teeth on a gang of driven rotary cutters chop or shear small particles off the material advanced by the conveyor. The rotary cutters are mounted in side by side relation to some length on a common shaft, and the cutting bar is one integral continuous straight edged member extending the combined length of the gang of cutters and rigidly secured closely adjacent the path of travel of peripheral edges of the revolving cutting teeth to operate as a shear on material fed thereover. The individual cutting teeth on the rotary cutter are fused from hard steel directly on solid thick steel plates which are keyed and bolted onto the common shaft without any other removable parts or attachments to become loose or separated from the cutter. The cutting teeth extend substantially radially from the shaft in staggered relation so as to rotate in succession past the cutter bar. The present construction eliminates the use of small parts such as individual cutter blades, individual cutter bar elements, and a multiplicity of securing bolts, washers and nuts which in the past have been found likely to come loose and get in the path of the revolving cutters. The elimination of such small parts not only reduces the cost of the machine and makes it more rugged and reliable in operation, but also removes a serious hazard to workmen from flying pieces of metal.

Moreover, the present construction is intended to facilitate the removal of the cutting bar and rotary cutter blades for sharpening and replacement. The simple construction of the cutting bar facilitates its removal and enables it to be easily sharpened in one simple grinding operation to provide two cutting edges for use before the next resharpening. The rotary cutter blades although securely mounted are likewise easily removed when necessary.

The details of construction of the preferred embodiment will be better understood with reference to the accompanying drawings, in which:

Figure 1 is a plan view of a preferred embodiment of hog machine constructed according to the principles of the present invention;

Figure 2 is a side elevational view taken on the line 2—2 of Figure 1;

Figure 3 is a longitudinal sectional view taken on the line 3—3 of Figure 1;

Figure 4 is an enlarged sectional view taken on the line 4—4 of Figure 1;

Figure 5 is a view taken approximately on the line 5—5 of Figure 4, showing the face of the cutting bar and associated parts, certain of these parts being broken away to reveal other parts;

Figure 6 is a fragmentary enlarged sectional view of the cutting bar and an adjacent cutting tooth;

Figure 7 is a perspective view of one of the rotary cutting blades;

Figure 8 is a longitudinal sectional view of a modification employing a shaker feed in lieu of the belt feed shown in Figure 3;

Figure 9 is a similar view of another modification employing an endless chain conveyor feeding means; and Figure 10 is a view taken on the line 10—10 of Figure 9.

The operating parts of the present machine are mounted upon a rigid base comprising a pair of channel beams 10 which support respective side frames 11. Extending between the side frames 11 is the discharge end of a conveyor belt 12 adapted to carry refuse veneer, chips, and other waste wood material 13 into the machine. The belt 12 passes around and is driven by a drum pulley 14 keyed on a transverse shaft 16 which is journaled in the side frames 11. Driving means for the pulley shaft comprise a motor 18 and a train of gears 17 at one end of the shaft.

The opposite end of the shaft 16 carries a gear 19 keyed thereon which meshes with and drives a pinion 20 on a stud shaft 20a. A sprocket 21 is keyed to stud shaft 20a and drives a sprocket 22 through a chain 23. A sprocket 24 is secured to and rotates with the sprocket 22, these two sprockets being freely rotatable together as a unit on a stud shaft 26 which is fixedly mounted in one of the side frames 11. The other side frame carries a second stud shaft 26a in alignment with the stud shaft 26. A sprocket wheel 27 is driven by sprocket 24 through a chain 28, the sprocket 27 being keyed on the end of a shaft 29 carrying a roller feed drum 30 secured thereto.

In the present embodiment the cylindrical surface of the feed drum 30 is fabricated from one or more steel plates having deposited thereon a plurality of ridges or beads 31 of weld metal by which traction cleats are formed for assisting the conveyor 12 in moving the material 13 against whatever resistance it may encounter at that point. This driving arrangement assures a positive feed and prevents the material from backing up or piling up on the conveyor at the entrance to the hog.

The ends of shaft 29 of the roller feed drum are journaled in a pair of sockets 32 which are threaded on a pair of radius rods or arms 33 on opposite sides of the machine. The rods 33 are in turn threaded into sockets 34 which are pivotally mounted on the stud shafts 26 and 26a, respectively. Turning of the rods 33 in the sockets 34 is prevented by lock nuts or other convenient means, but the sockets 32 are free to turn on the rods. The drum 30 is thereby mounted to swing in a vertical arc about the stud shafts 26 and 26a to allow it to rise and fall with the varying thickness of material passing beneath it on the conveyor belt 12. The driving ratios of the various sprockets are such that the peripheral speed of the drum 30 is the same as that of the conveyor belt 12.

Adjustable stops 36 prevent the drum 30 and the raised seams 31 from coming into direct contact with the conveyor belt to prevent scuffing on the belt when its surface is not covered with material coming into the machine. These stops may be set to allow the drum to closely approach the belt whereby the drum will ordinarily ride on top of the material on the belt to maintain pressure contact with the material to at all times assist the conveyor belt in feeding the machine. The sockets 32 being free to turn on the rods 33 allow the drum 30 to rise higher at one end or the other on unevenly distributed material without causing binding of the shaft 29 in the sockets. Thus, when the machine is in operation, the weight of the drum 30 rests upon the material 13 on the conveyor belt which at this point is directly supported upon the conveyor pulley 14 by reason of the fact that the shaft 29 in its normal position is directly above the shaft 16.

A stationary cutter bar 37 is mounted just behind the discharge end of the conveyor belt. This cutter bar extends transversely between the side frames 11 and is rigidly supported by a plate 38 which is in turn securely bolted to a heavy transverse angle support 39. The angle support 39 extends across the frame and is secured to the channel base members 10. The supporting plate 38 also carries a shelf 41 to bridge the gap between the end of the conveyor belt 12 and the cutter bar 37 to provide a smooth continuous surface for material received from the belt. The cutter bar 37 rests upon a shoulder 38a on the support plate 38 and is rigidly secured in this position by a clamping plate 42 engaged by bolts 43 passing through the supporting plate at intervals, as shown in Figures 4 and 5.

As best shown in Figure 6, the cutter bar 37 comprises a straight edged, flat rectangular steel bar having insets 44 along the upper edge on opposite faces, these insets being fused to the bar 37 to become integrally united therewith. The material of the insets comprises steel of great hardness capable of maintaining sharp cutting edges under long and severe use. By turning the bar around to reverse the back and front sides two cutting edges are made successively available between sharpening operations. In a sharpening operation a small amount of metal is removed from the top edge of the bar, and to compensate for this reduction in height one or more shims 45 may be inserted under the lower edge of the bar on top of the shoulder 38a after each sharpening to seat the bar firmly on this shoulder with the top cutting edge always at the same height. By providing vertical slots 46 for the clamping bolts 43, the cutter bar may thus be adjusted upwardly after each sharpening operation without interfering with the clamping action.

Parallel and adjacent the cutter bar 37 is mounted a rotary cutter, indicated generally by the numeral 50. The cutter 50 is made up of a plurality of separate elements carried by a shaft 51 journaled in bearings 52 on bearing supports 53. One end of the shaft is driven by a heavy duty motor 54 and the other end of the shaft is equipped with a flywheel 55. Between these ends the shaft 51 carries a plurality of identical mated castings constituting cutter blades which are positioned in compact side by side relation along the shaft in a spiral arrangement. In the present embodiment the cutter blades spiral toward the center from each end in the general pattern of a herringbone gear. The two end cutter blades are accordingly secured on the shaft in the same angular position, and then in progressing toward the center of the shaft from each end, each cutter blade in turn is set approximately 51° from the preceding blade, whereby with fifteen cutter blades the center blade will be in the same angular position as the end blades. Each blade has two cutting edges, making a total of thirty cutting edges passing the cutting bar in each revolution.

Each of the fifteen cutter blades comprises a pair of cutter plates 58 which are identical except for the fact that one of each pair has a key slot 59. Keys 60 disposed in keyways 61, spirally arranged at approximately 51° intervals around the shaft 51, hold the cutter blades in their proper positions in the spiral arrangement just described. The cutter plates are semicircular so that they may be paired, or mated, on their diameters to encircle the shaft 51 and be retained in the proper angular position by one of the keys 60. The periphery of each plate 58 is relieved at 62 on opposite sides to form a pair of ears 63 which are adapted to receive clamping bolts 64. The bolts 64 thereby clamp the two cutter plates of each pair together on the shaft 51 to retain the key 60, as shown in Figure 3.

Projecting generally radially from a central portion of each plate 58 midway between the ears 63 is an integral cutting tooth 65 of the same thickness as the plate and having a forward face 65a in a plane inclined forwardly in the direction of rotation from a true radial plane. In the present embodiment the plane of the forward face 65a of each tooth is approximately tangential to the shaft 51. This forward inclination of the forward face provides a relief for the cutting tooth so that the cutting edge 66 engages and enters the material ahead of the rest of the tooth face. The cutting edge 66 is also formed on an angle with reference to the axis of the shaft 51, as shown in Figure 1, to produce a shearing rather than a chopping action on the cutting bar 37, and this angular relationship is reversed on opposite ends of the rotary cutter to tend to work material away from the sides and toward the center of the machine. The cutting edge 66 is preferably built up of insets or weld metal of great hardness having the same characteristics as the previously described insets 44 in the cutting bar 37. The cutting edge of each tooth, although having different characteristics from the material of the remainder of the plate 58, is nevertheless integrally united and fused therewith so that it cannot become loose or displaced in the operation of the machine.

It will be noted in Figure 4 that the center of the rotary cutter 50 is slightly above the level of the top surface of the cutter bar 37. This relation between the cooperating cutting members in conjunction with the forward inclination of the teeth 64 is found to be advantageous in promoting a tendency to drag the material into the path of the cutting teeth. The cutter 50 thereby tends to feed itself rather than to resist the advance of material thereto, this action being accomplished by a horizontal component of force applied to the material by the downward and slightly forward movement of the cutting teeth 65. If the force exerted by the forward face 65a upon the material is resolved into vertical and horizontal components, it will be readily apparent that the horizontal vector acts to the left in Figures 4 and 6. Any material which may, however, be momentarily pushed back by the teeth 65 is immediately returned by reason of the proximity of feed drum 30, preventing material from piling up or spilling back upon the conveyor belt.

The integral formation of the teeth 65 on the cutter plates 58, and the integral formation of the single cutting bar 37 provides a very rugged construction having relatively few parts which must be fastened together, and wherein the size and proportions of the parts provide an ample conservative safety factor for the stresses to which they are subjected. The present construction thereby makes for great reserve strength and durability in which the likelihood of breakage, deformation or loosening of the parts is greatly reduced in comparison with conventional machines presently in use.

A conveyor 70 may be disposed beneath the frame of the machine, as shown in Figure 3, to carry away the chips 13a produced by the rotary cutter. Surrounding the cutter is a housing 71 having a cover 72 hinged at 73 which may be raised to give access to the cutter. When the cover is closed it leaves a small opening in the housing to admit the material 13.

Other feeding arrangements in lieu of the belt conveyor 12 may be employed to bring the material 13 into the hog machine, two such modifications of the feeding mechanism being illustrated in Figures 8 to 10. In these figures similar reference numerals are applied to those parts of the machine already shown and described in connection with the preceding figures, it being understood, therefore, that there is no alteration in the arrangement of the rotary cutter 50, the cutter bar 37, the shelf 41 and the feed drum 30. Also, it will be noted in Figure 8 that the pulley or roller 14 is retained on the shaft 16 vertically beneath the shaft 29 and the drum 30.

The conveyor belt 12 has been removed from the pulley 14, however, and in its place there is substituted a shaker trough 75 extending almost into the nip of the roll 14 and drum 30. The trough 75 is substantially the full width of the machine and has upstanding side portions 76 to retain the material 13 as it is received from a delivery conveyor 77. The trough is supported in an inclined position upon lower bearings 78 and upper bearings 79 for oscillatory shaking movement to feed the chips and scraps 13 into the hog machine. The bearings 78 carry shaft elements, or may themselves comprise trunnions, supported in bearings 80 in the upper ends of oscillating arms 81 which are mounted at the lower ends in fixed pivots 82 carried by supporting members 83 on the frame 10. The bearings 79 are mounted upon eccentrics 84 on a shaft 85 journaled on fixed supporting members 86.

The shafts 16 and 29 are driven by the motor 18 in the manner illustrated in Figures 1 and 2, and the shaft 85 may also be driven by this motor or by an independent driving means which will impart an effective shaking frequency to the shaker mechanism. The operation of the shaker mechanism delivers the material between the roll 14 and the drum 30 so that it is handled by these two members in substantially the same way as if it had been delivered by the belt 12. The rotation of the roll and drum keeps the material feeding into the hog machine at a substantially constant rate and prevents material from being pushed back onto the shaker by the rotary cutter.

In the modification shown in Figures 9 and 10 the roller 14 is replaced by a series of sprockets 14a side by side on the shaft 16 and carrying a mat of chains 12a in place of the belt 12. If the pieces fed into the machine on this conveyor system include relatively fine material, an inclined table or trough 90 may be provided beneath the chains as shown. The chain feed will then handle the same class of material as the preceding embodiments, the fine chips and sawdust being scraped along on the table 90 along with the larger pieces riding on top of the chains. The table 90 may be provided with sides 91 on either side of the chain mat to prevent loss of the material before it reaches the hog machine.

Various other changes may be made in the construction and arrangement of parts, and all such modifications within the scope of the appended claims are included in the invention.

Having now described my invention and in what manner the same may be used, what I claim as new and desire to protect by Letters Patent is:

1. In a hog machine, a cutting bar support having a supporting shoulder and clamping face in right angular relationship, a straight edged cutting bar supported on said shoulder and against said clamping face, a plurality of slots in said cutting bar perpendicular to said straight edge, a clamping plate, and clamping means engaging said support and clamping plate and passing loosely through said slots to clamp said cutting bar firmly against said clamping face in adjusted position with respect to said supporting shoulder to provide for the insertion of a shim between said cutting bar and said shoulder.

2. A rotary cutter for a hog machine comprising a shaft, a spiral series of key slots in said shaft, keys in said key slots, a pair of semicircular cutting plates each having one tooth and a pair of ears, a key slot in one of said plates, and means engaging said ears to clamp said cutting plates on said shaft in the angular position determined by one of said key slots in said shaft, there being one such clamped assemblage fixedly mounted on said shaft at each of said key slots, said key slots in said plates being in similar positions in all of said clamped assemblages and said assemblages being identical to provide a spiral arrangement of cutting teeth on said cutter.

3. In a hog machine, a straight edged cutting bar, a rotary cutter comprising a plurality of cutting blades mounted in double spiral arrangement on a shaft to cut material on said cutter bar, each of said cutting blades comprising two substantially identical semi-circular plate members clamped together on said shaft, and a single tooth on each of said plate members, there being an odd number of cutting blades on said shaft, the end and center blades being in the same angular position and the remaining blades on each side of the center blade being fixed to said shaft at equal angular intervals and in such number that all the teeth on said remaining blades on the same side of the center are disposed in different angular positions with the teeth on opposite sides of said center blade spiralling around the shaft in the same angular direction, whereby no more than three teeth on said cutter can pass said cutter bar at the same instant.

IRVEN S. BECKER.

REFERENCES CITED

The following references are of record in the file of this patent:

UNITED STATES PATENTS

| Number | Name | Date |
| --- | --- | --- |
| 133,270 | Taylor | Nov. 19, 1872 |
| 579,305 | Perkins | Mar. 23, 1897 |
| 679,177 | Lykke | July 23, 1901 |
| 810,204 | Harrison | Jan. 16, 1906 |
| 916,913 | Chandler | Mar. 30, 1909 |
| 1,249,663 | Peterson | Dec. 11, 1917 |
| 1,512,484 | Porter | Oct. 21, 1924 |
| 1,515,377 | White | Nov. 11, 1924 |
| 2,126,072 | Westerlund | Aug. 9, 1938 |
| 2,224,948 | Bloomquist | Dec. 17, 1940 |
| 2,237,510 | Tankersley | Apr. 8, 1941 |
| 2,281,264 | Bruno | Apr. 28, 1942 |
| 2,335,515 | Jehle | Nov. 30, 1943 |
| 2,399,529 | Willits | Apr. 30, 1946 |

FOREIGN PATENTS

| Number | Country | Date |
| --- | --- | --- |
| 178,097 | Germany | Nov. 8, 1906 |
| 285,850 | Italy | May 23, 1931 |
| 569,122 | Great Britain | May 4, 1945 |